(12) United States Patent
Spitler et al.

(10) Patent No.: US 10,046,477 B2
(45) Date of Patent: Aug. 14, 2018

(54) SKIN STIFFNESS CHARACTERISTICS AND LOFT CONTROL PRODUCTION SYSTEM AND METHOD WITH VARIABLE MOISTURE CONTENT IN INPUT FIBERGLASS MEDIA

(71) Applicants: Charles Douglas Spitler, Southlake, TX (US); Rodney Ray Wilkins, Granville, OH (US)

(72) Inventors: Charles Douglas Spitler, Southlake, TX (US); Rodney Ray Wilkins, Granville, OH (US)

(73) Assignee: Superior Fibers, LLC, Reedsville, WV (US)

( * ) Notice: Subject to any disclaimer, the term of this patent is extended or adjusted under 35 U.S.C. 154(b) by 0 days.

(21) Appl. No.: 15/640,302

(22) Filed: Jun. 30, 2017

(65) Prior Publication Data

US 2018/0043569 A1 Feb. 15, 2018

Related U.S. Application Data

(63) Continuation of application No. 15/081,622, filed on Mar. 25, 2016, now Pat. No. 9,694,510.
(Continued)

(51) Int. Cl.
| | |
|---|---|
| *B27N 3/08* | (2006.01) |
| *D04H 1/4226* | (2012.01) |
| *B29C 43/48* | (2006.01) |
| *B29C 35/06* | (2006.01) |
| *B29C 43/52* | (2006.01) |
| *B29C 70/50* | (2006.01) |
| *B30B 5/06* | (2006.01) |

(Continued)

(52) U.S. Cl.
CPC .............. *B27N 3/086* (2013.01); *B27N 3/24* (2013.01); *B29C 35/06* (2013.01); *B29C 43/22* (2013.01); *B29C 43/48* (2013.01); *B29C 43/52* (2013.01); *B29C 70/504* (2013.01); *B30B 5/06* (2013.01); *D04H 1/4226* (2013.01); *B29C 2043/483* (2013.01)

(58) Field of Classification Search
CPC ......... B29C 43/22; B29C 43/48; B29C 43/52; B29C 2043/483; B29C 35/06; B30B 5/06; B27N 3/086; B27N 3/24
See application file for complete search history.

(56) References Cited

U.S. PATENT DOCUMENTS

| | | |
|---|---|---|
| 2,081,060 A | 5/1937 | Modigliani |
| 2,357,676 A | 9/1944 | Mack |
| | (Continued) | |

FOREIGN PATENT DOCUMENTS

WO 2011106537 A1 9/2011

*Primary Examiner* — Atul P. Khare
(74) *Attorney, Agent, or Firm* — Bakos & Kritzer (57) ABSTRACT

A heating system is provided having a plurality of heated zones, with at least a first zone and a second zone. The first zone receives variable input moisture fiberglass over a first conveyor system and comprises a first compression system above the first conveyor system. Each zone has a fire box at the top and an exhaust stack. Heated air is up drafted through the bottom of the first zone, where the heated air flows from the bottom through the conveyor belt, through the fiberglass media, through the tensioned compression chain, and out the exhaust stack of the first zone. The first zone establishes fiberglass loft, with the second zone providing cure of the fiberglass.

20 Claims, 9 Drawing Sheets

Related U.S. Application Data

(60) Provisional application No. 62/177,926, filed on Mar. 27, 2015.

(51) Int. Cl.
*B29C 43/22* (2006.01)
*B27N 3/24* (2006.01)
*B01D 39/00* (2006.01)

(56) References Cited

U.S. PATENT DOCUMENTS

| | | | |
|---|---|---|---|
| 2,505,045 A | 7/1948 | Holcomb | |
| 2,644,780 A | 1/1949 | Simkins et al. | |
| 2,460,899 A | 2/1949 | Modigliani et al. | |
| 2,486,217 A | 10/1949 | Slack et al. | |
| 2,546,230 A | 3/1951 | Modigliani | |
| 2,574,221 A | 11/1951 | Modigliani | |
| 2,609,320 A | 9/1952 | Modigliani | |
| 2,779,969 A | 1/1953 | Bose | |
| 2,639,759 A | 5/1953 | Simison | |
| 2,729,582 A | 1/1956 | Modigliani | |
| 2,751,483 A | 6/1956 | Keen et al. | |
| 2,798,531 A | 7/1957 | Jackson | |
| 2,913,037 A | 11/1959 | Modigliani | |
| 2,964,439 A | 12/1960 | Modigliani | |
| 2,997,096 A | 8/1961 | Morrison et al. | |
| 3,051,602 A | 8/1962 | Schairbaum | |
| 3,082,615 A | 3/1963 | Alvarez de Toledo | |
| 3,096,161 A | 7/1963 | Morrison et al. | |
| 3,097,710 A | 7/1963 | Copenhefer | |
| 3,134,704 A | 5/1964 | Modigliani | |
| 3,278,282 A | 10/1966 | Jaray | |
| 3,322,585 A | 5/1967 | Weber et al. | |
| 3,459,613 A | 8/1969 | Copenhefer et al. | |
| 3,476,635 A | 11/1969 | Heh | |
| 3,526,488 A | 9/1970 | Schweppe et al. | |
| 3,526,557 A | 9/1970 | Taylor, Jr. | |
| 3,573,016 A | 3/1971 | Rees | |
| 3,623,857 A | 11/1971 | McFadden et al. | |
| 3,826,903 A | 7/1974 | Varasso | |
| 3,837,138 A | 9/1974 | Terry | |
| 3,937,860 A | 2/1976 | Gusman et al. | |
| 4,121,918 A | 10/1978 | Shono et al. | |
| 4,188,197 A | 2/1980 | Amberkar et al. | |
| 4,227,906 A | 10/1980 | Reiser | |
| 4,263,007 A | 4/1981 | Battigelli et al. | |
| 4,321,074 A | 3/1982 | Glaser et al. | |
| 4,334,468 A | 6/1982 | Guttinger et al. | |
| 4,363,645 A | 12/1982 | Eisenberg | |
| 4,380,462 A | 4/1983 | Shono et al. | |
| 4,556,154 A | 12/1985 | Bajtala et al. | |
| 4,601,937 A | 7/1986 | Latussek | |
| 4,773,764 A | 9/1988 | Colombani et al. | |
| 4,940,502 A | 7/1990 | Marcus | |
| 5,139,841 A | 8/1992 | Makoui et al. | |
| 5,149,394 A | 9/1992 | Held | |
| 5,284,546 A | 2/1994 | Tilby | |
| 5,330,595 A | 7/1994 | Held | |
| 5,340,651 A | 8/1994 | Esu | |
| 5,458,051 A | 10/1995 | Alden et al. | |
| 5,532,050 A | 7/1996 | Brooks | |
| 5,578,371 A | 11/1996 | Taylor et al. | |
| 5,612,405 A | 3/1997 | Bainbridge et al. | |
| 5,618,622 A | 4/1997 | Gillberg-Laforce et al. | |
| 5,634,954 A | 6/1997 | Kern | |
| 5,672,399 A | 9/1997 | Kahlbaugh et al. | |
| 5,695,848 A | 12/1997 | Wilkins et al. | |
| 5,832,696 A | 11/1998 | Nagy et al. | |
| 5,846,603 A | 12/1998 | Miller | |
| 6,054,081 A | 4/2000 | Bielfeldt | |
| 6,136,058 A | 10/2000 | Miller | |
| 6,200,682 B1 | 3/2001 | Dubelsten et al. | |
| 6,605,245 B1 | 8/2003 | Dubelsten et al. | |
| 6,821,614 B1 | 11/2004 | Dubelsten et al. | |
| 6,863,512 B2 | 3/2005 | Dubelsten et al. | |
| 8,057,566 B1 | 11/2011 | Sanders et al. | |
| 8,080,488 B2 | 12/2011 | Anderson et al. | |
| 8,393,180 B1 | 3/2013 | Sanders et al. | |
| 9,101,860 B2 | 8/2015 | Green et al. | |
| 2004/0163540 A1 | 8/2004 | Mori et al. | |
| 2005/0006808 A1 | 1/2005 | Thomas | |
| 2005/0067113 A1 | 3/2005 | Colson et al. | |
| 2005/0138832 A1 | 6/2005 | Hada et al. | |
| 2006/0093815 A1 | 5/2006 | Wilkins | |
| 2007/0049143 A1 | 3/2007 | D'Silva et al. | |
| 2008/0015201 A1 | 1/2008 | Grooms et al. | |
| 2008/0105612 A1 | 5/2008 | Chappas | |
| 2010/0139224 A1 | 6/2010 | Lim et al. | |
| 2011/0086567 A1 | 4/2011 | Hawkins et al. | |
| 2011/0114554 A1 | 5/2011 | Li et al. | |
| 2012/0255662 A1 | 10/2012 | Green | |
| 2012/0271445 A1 | 10/2012 | Li et al. | |
| 2012/0298582 A1 | 11/2012 | Kanani et al. | |
| 2012/0304603 A1 | 12/2012 | Wyss et al. | |
| 2014/0196423 A1 | 7/2014 | Barrows et al. | |

SKIN STIFFNESS CHARACTERISTICS AND LOFT CONTROL PRODUCTION SYSTEM AND METHOD WITH VARIABLE MOISTURE CONTENT IN INPUT FIBERGLASS MEDIA

CROSS-REFERENCE TO RELATED APPLICATIONS

This application is a continuation of U.S. patent application Ser. No. 15/081,622, filed Mar. 25, 2016, now U.S. Pat. No. 9,694,510, which claims the benefit of U.S. Patent App. No. 62/177,926, filed Mar. 27, 2015, and the foregoing applications are incorporated by reference herein in their entirety.

TECHNICAL FIELD

The present disclosure relates to improvements to the Modigliani process (U.S. Pat. No. 2,081,060; U.S. Pat. No. 2,546,230; and U.S. Pat. No. 2,913,037) as a system, method and apparatus for control of skin stiffness characteristics on the surface of fiberglass filtration media and controlled loft production with variable input moisture content. The Modigliani patents provide very few details on how curing is accomplished. Moisture variability problems are with unexpanded fiberglass mat entering the heating apparatus, not the moisture of the finished fiberglass media.

BACKGROUND

During the production of fiberglass, moisture content of uncured media entering the curing process, skin firmness characteristics of cured media and finished product uniformity are difficult to control. Additionally, the production of fiberglass has required multiple additives to control loft and stiffness but these additives cause problems in processing that must be adjusted by formulation or processing changes. Purchasers of fiberglass media cite problems caused by small deviations in loft, skin characteristics and uniformity of media.

Current methods utilize many catalysts, buffers, and miscellaneous additives to adjust pH, viscosity etc. of resin binder to achieve better quality fiberglass. Curing methods today tend to be intolerant of variability in uncured unexpanded fiberglass mat moisture content. Current methods or apparatuses cannot consistently produce stiffer, well defined skin characteristics. Most systems and methods today do not use up-drafting of hot curing air to prevent clogging in the exhaust and to provide cleaner belts in the apparatus.

Additionally, other methods of making fiberglass such as insulation fiberglass use spinneret devices where molten glass is dumped into a spinning pot with holes in the sides. As the glass strands exit the sides by centrifugal force, they are blasted with compressed air which cuts the fiberglass strands into short lengths. These spinnerets move from side to side over a moving conveyor to get them distributed in an even layer before entering curing ovens. In some cases the ovens utilize updraft, some cases downdraft and in other cases both updraft and downdraft are utilized. This disclosure relates to continuous strand filament fiberglass, not short lengths as is used in insulation.

It would be advantageous to provide a method regulating moisture.

It would also be advantageous to provide a method that can tolerate more moisture variations in uncured unexpanded fiberglass mat entering the heating apparatus.

It would further be advantageous to provide a system and method that can consistently produce the desired skin firmness and thickness characteristics.

It would further be advantageous to provide a method of heating a multi-zoned system at specified temperatures utilizing an updraft technique.

It would still further be advantageous to provide a method of creating greater loft consistency.

Thus, there remains a considerable need for systems, methods and devices that control skin stiffness characteristics on the surface of fiberglass filtration media providing controlled loft production with variable input moisture content.

SUMMARY

The present disclosure provides a heating apparatus for curing input fiberglass with variable moisture content where such heating apparatus adjusts fiberglass loft and provides better controlled skin characteristics. In the preferred embodiment, the heating apparatus has a plurality of heated zones of varying lengths not less than fifteen feet in any zone. A first heated zone operates at a temperature range of three hundred degrees Fahrenheit (300° F.) to five hundred degrees Fahrenheit (500° F.), and a second heated zone operates at a temperature of two hundred and seventy-five degrees Fahrenheit (275° F.) to five hundred degrees Fahrenheit (500° F.). The second heated zone operates on its low temperature range end at least twenty-five degrees cooler than the first heated zone. Integrated tensioner mechanisms (tensioner system and tensioner belts and chain) control tension on the lower conveyor chain and the upper compression conveyor belt. The first heated zone has a tensioned compression system for the fiberglass media with the second heated zone available for additional curing. The first heated zone receives conveyed fiberglass media under an upper compression conveyor belt. The upper compression conveyor belt is attached to lateral support devices, preventing downward deflection of the belt across the width of the fiberglass media. The lateral support devices are attached at each end to a roller chain with rollers riding in a support track. The upper compression conveyor belt is constructed of a wire mesh allowing air to flow through the belt. The upper compression conveyor belt assembly mounts in the frame which may be raised and lowered by utilizing synchronized lifting jacks. In the preferred embodiment, the movement of the upper compression conveyor belt to change loft could be shorter than 3 seconds up to a maximum of 20 seconds for fiberglass loft changing from ¼ inch loft to 5 inch loft. Temperature sensors near the surface of the fiberglass media in each of the heated zones are used to automatically control gas valves in each firebox to maintain a constant temperature. An alternating current (AC) inverter in a closed-loop system synchronizes the speeds of the upper compression conveyor belt to that of a post oven accumulator and a post oven wind-up assembly. Both the post oven accumulator and the post oven wind-up assembly further synchronize with the speed of the lower conveyor chain which precludes abrading of the surface of the media and controls tension on the media, further improving the surface of the fiberglass media. Each heated zone has a fire box, a blower and a separate exhaust stack positioned at the topmost section of the heated zone. Heated air is blown downward from the firebox and the blower through a ducting system that conveys air downward around the exterior of the oven to a first heated zone distribution duct below the fiberglass media. Heated air exits the distribution duct through a series of openings causing heated air to flow upward. The benefit of updraft is when secondary backers (e.g. scrim or high-loft polyester) are added to the bottom of the fiberglass mat before entry into the oven, the updraft helps bond the secondary layer to the media.

Heated air is collected above the media through adjustable holes in a return air plenum at the topmost part of the first heated zone. The heated air returns to the firebox and blower assembly in a way that a percentage of recirculating air from the plenum can be controlled, and air exhausts out an exhaust stack in the first heated zone and an exhaust stack in a second heated zone.

Loft may also be controlled through the use of a lift mechanism (e.g., lifting jacks) which adjusts and moves the upper compression conveyor belt either up or down automatically. In the preferred embodiment, this movement of the upper compression conveyor belt to change loft is typically 3 seconds, but could be a maximum of 20 seconds if the fiberglass loft changes from ¼ inch loft to 5 inch loft, all at once. All zones are independently heated to different temperatures, with the first zone having a temperature range of 300 degrees Fahrenheit to 500 degrees Fahrenheit, dependent on the curing requirement of the specific fiberglass product being processed.

BRIEF DESCRIPTION OF THE DRAWINGS

A complete understanding of the present disclosure may be obtained by reference to the accompanying drawings, when considered in conjunction with the subsequent, detailed description, in which.

For purposes of clarity and brevity, like elements and components will bear the same designations and numbering throughout the figures.

DETAILED DESCRIPTION

Disclosed is a heating apparatus for curing fiberglass having an extended length dual curing heating system with at least a fifteen foot first heated zone and at least a fifteen foot second heated zone. Neither the first heated zone nor the second heated zone has a maximum length of more than one hundred feet each. The first heated zone operates at a temperature range of three hundred degrees Fahrenheit (300° F.) to five hundred degrees Fahrenheit (500° F.) with the second heated zone operating at a temperature of two hundred and seventy-five degrees Fahrenheit (275° F.) to five hundred degrees Fahrenheit (500° F.). The second heated zone operates on the low temperature range end at least twenty-five degrees Fahrenheit (25° F.) cooler than the first heated zone.

Figure 1:
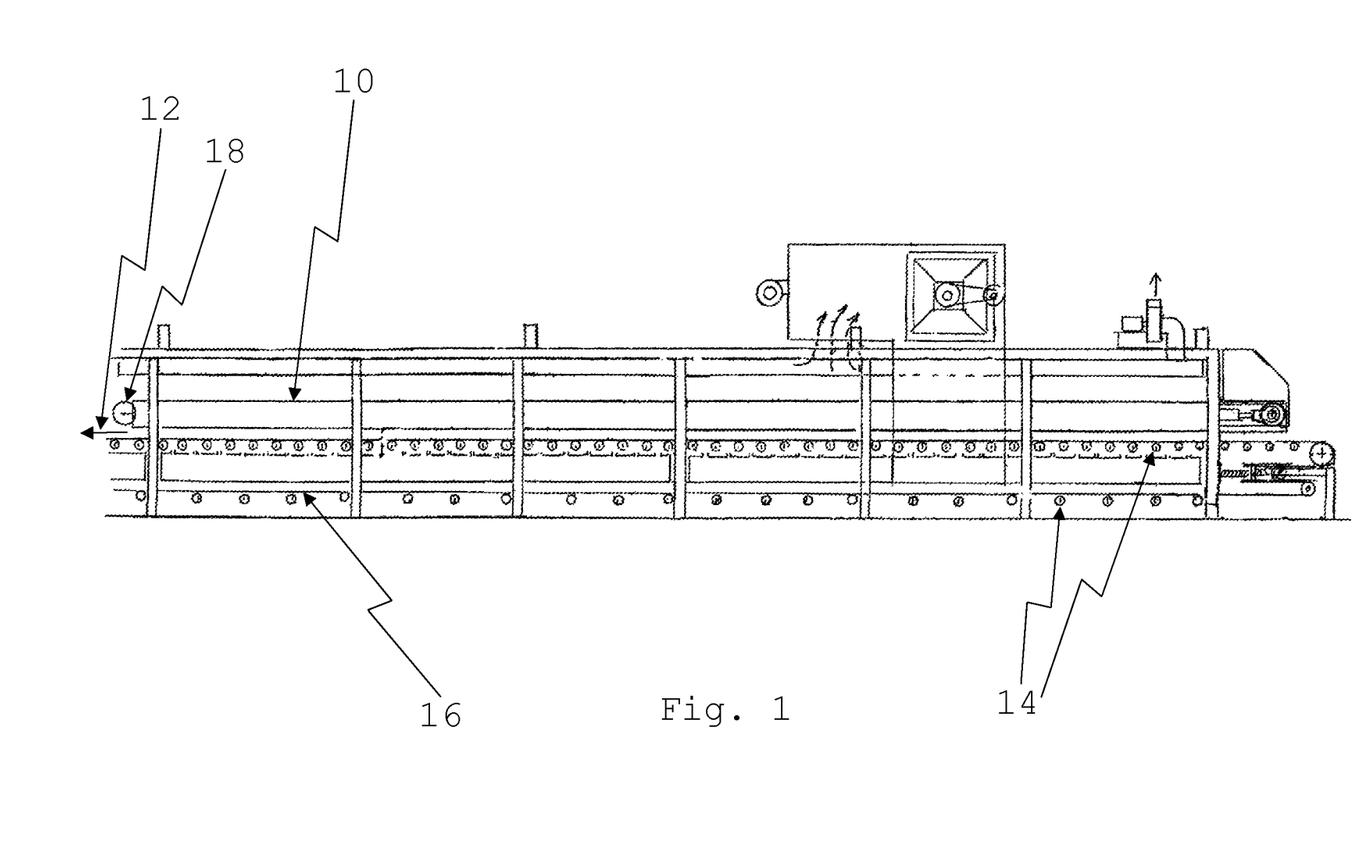
FIG. 1 shows a side view of a transport system for the first zone of a heating apparatus and depicts an upper compression conveyor belt 10, an upper compression conveyor belt drive sprocket 18, and rollers 14 supporting lower conveyor chain 16.
Figure 2:
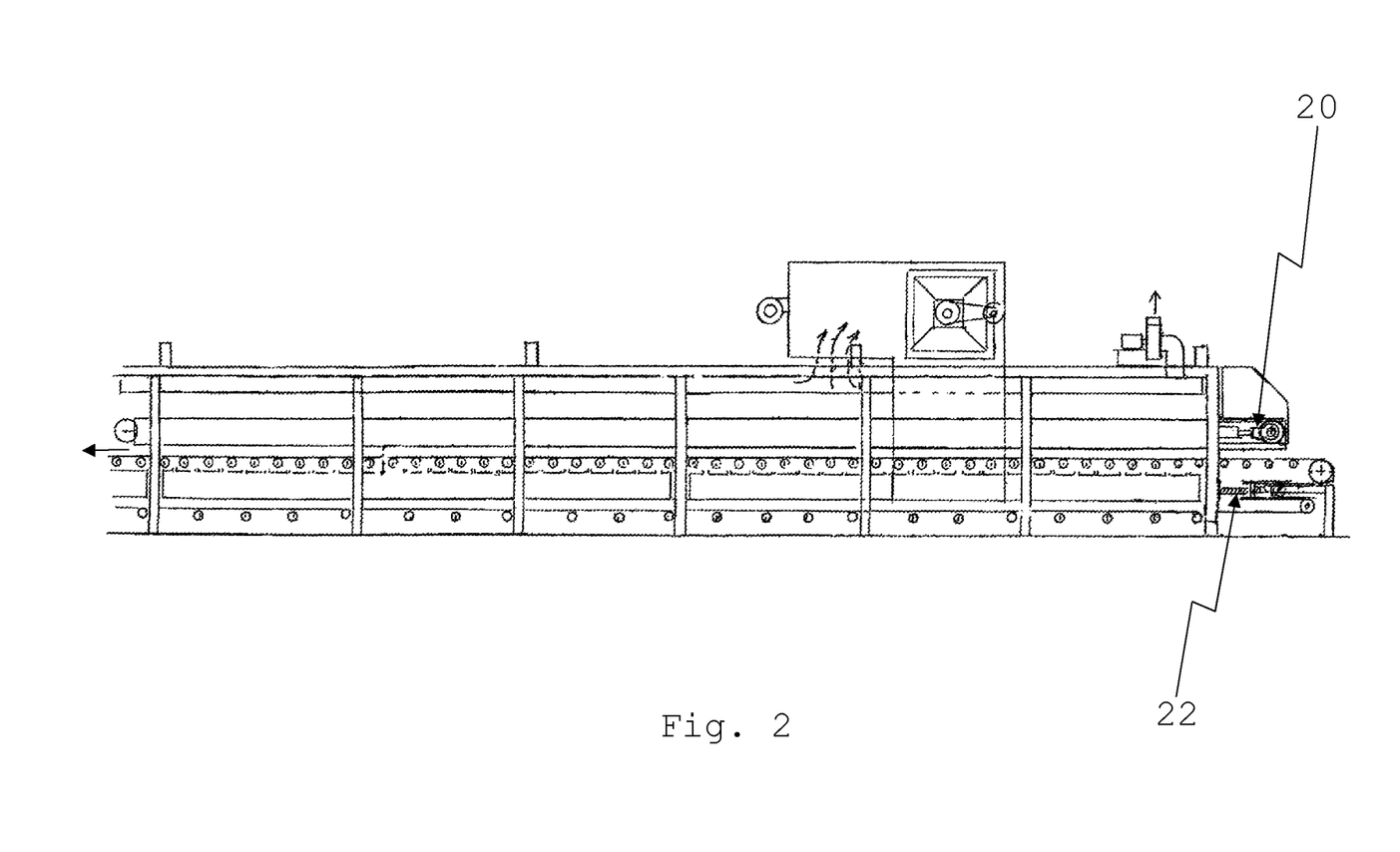
FIG. 2 shows a side view of a tension control for a first zone of a heating apparatus and depicts an upper compression conveyor belt tensioner 20 and a lower conveyor chain tensioner 22.
Figure 7:
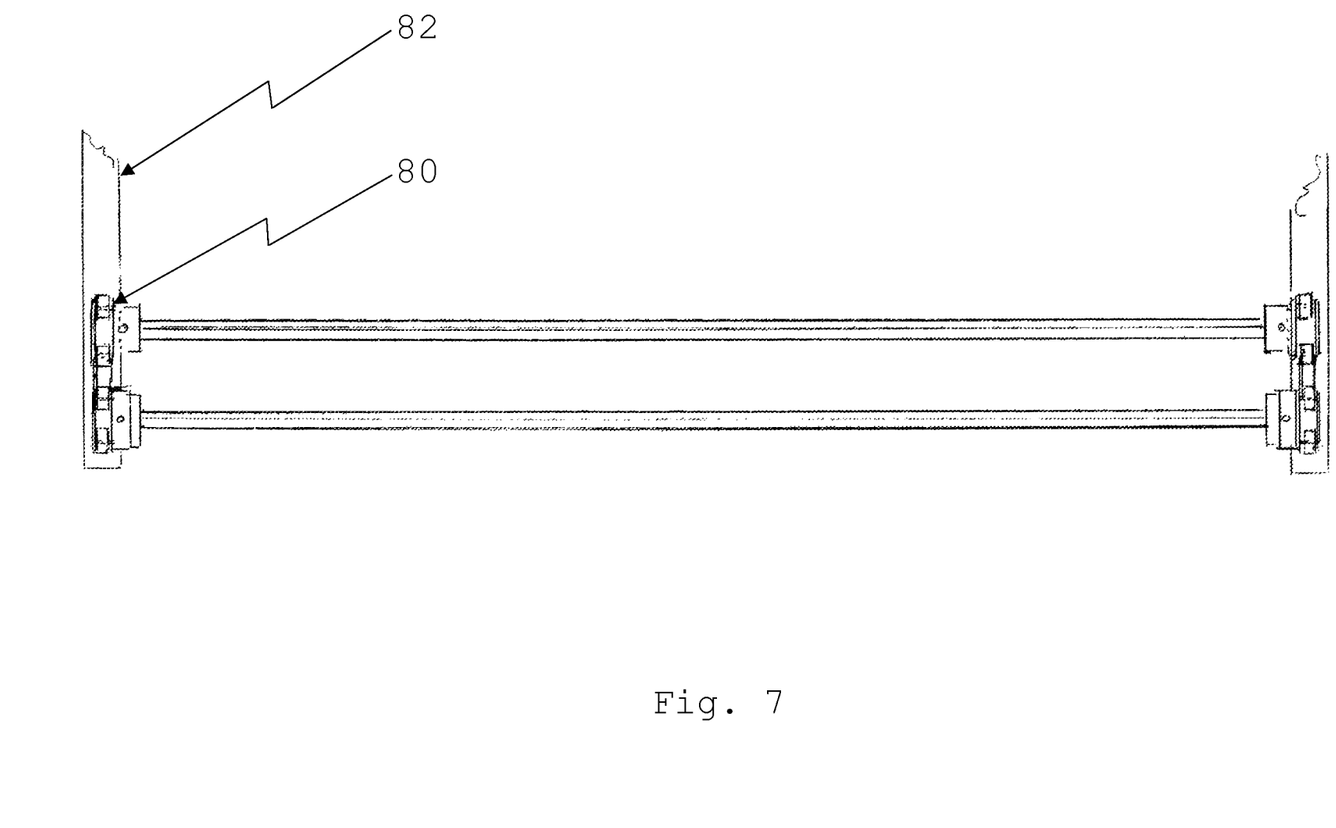
FIG. 7 shows a top view of an upper compression conveyor belt roller chain 80 and 3 inch by 3 inch support track 82.
Figure 8:
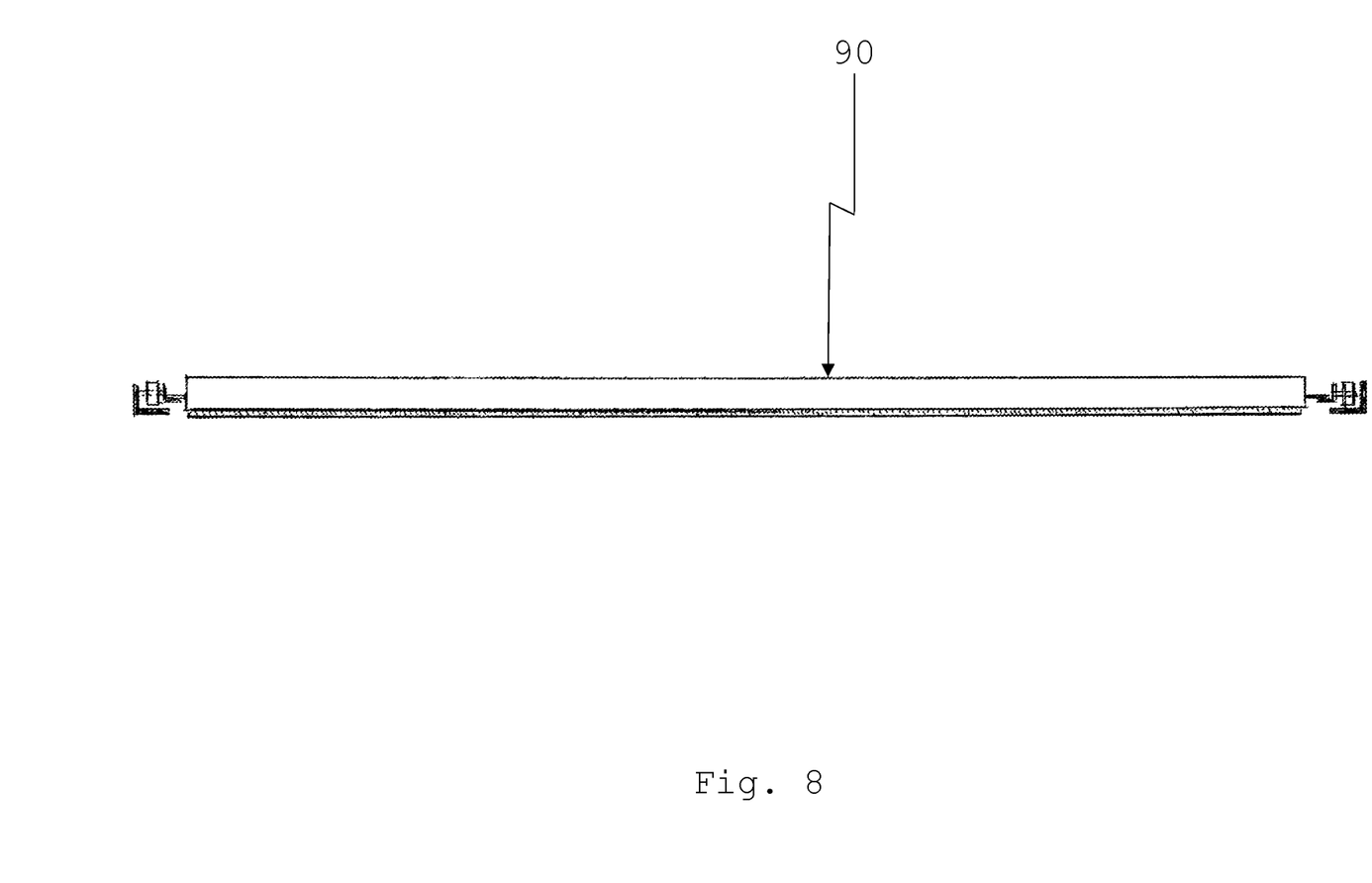
FIG. 8 shows an end view of upper compression conveyor belt lateral support devices 90.

With reference to FIGS. 1 and 2, integrated tensioner mechanisms (upper compression conveyor belt tensioner 20, lower conveyor chain tensioner 22, and upper compression conveyor belt drive sprocket 18) control tension on the lower conveyor chain 16 and the upper compression conveyor belt 10 with rollers 14 supporting the lower conveyor chain 16. The first heated zone has an upper tensioned compression system having an upper compression conveyor belt tensioner 20 and a lower conveyor chain tensioner 22 for the fiberglass media 12. The first heated zone receives conveyed fiberglass media over a first conveyor belt. An upper compression conveyor belt 10 is mounted to lateral support devices 90 (shown in FIG. 8), which are mounted perpendicular to the direction of travel of fiberglass media 12, thereby preventing downward deflection of the belt across the width of the fiberglass media 12. Lateral support devices 90 are attached at each end to an upper compression conveyor belt roller chain 80 (shown in FIG. 7) with rollers 14 riding in a support track 82 (shown in FIG. 7).

Figure 3:
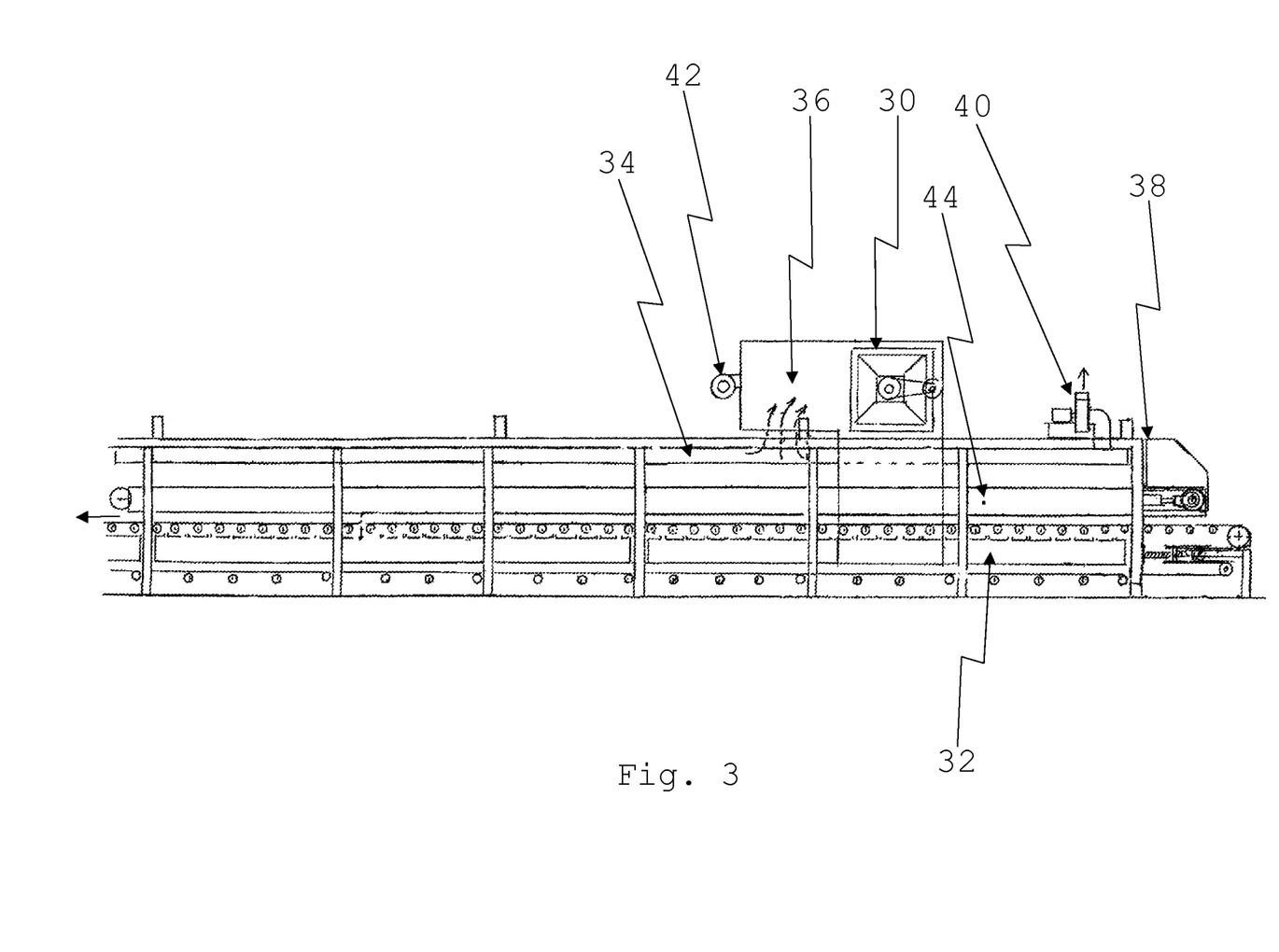
FIG. 3 shows a side view of an airflow control for a first zone of a heating apparatus and depicts a firebox and blower 30, hot air distribution duct 32, return air plenum 34, return air recycling direction of air flow 36, fume hood 38, return air plenum and fume hood exhaust stack 40, and make up air intake 42.

The upper conveyor compression belt 10 is composed of a wire mesh which allows air to flow through the belt. The upper compression conveyor belt 10 mounts in a support track 82 which can be raised and lowered by synchronized lifting jacks 60 (shown in FIG. 5). Temperature sensors near the surface of the fiberglass media in each of the first heated zone and the second heated zone are used to automatically control gas valves in each burner and firebox assembly 50 (shown in FIG. 4) to maintain a constant temperature. FIG. 3 depicts the position 44 of a temperature sensor. An alternating current (AC) inverter in a closed-loop system synchronizes the speeds of the upper compression conveyor belt 10, the post oven accumulator and the post oven wind-up assembly along with the speed of the lower conveyor chain 16, which precludes abrading of the surface of the fiberglass media 12 while further controlling tension on the fiberglass media 12.

Figure 6:
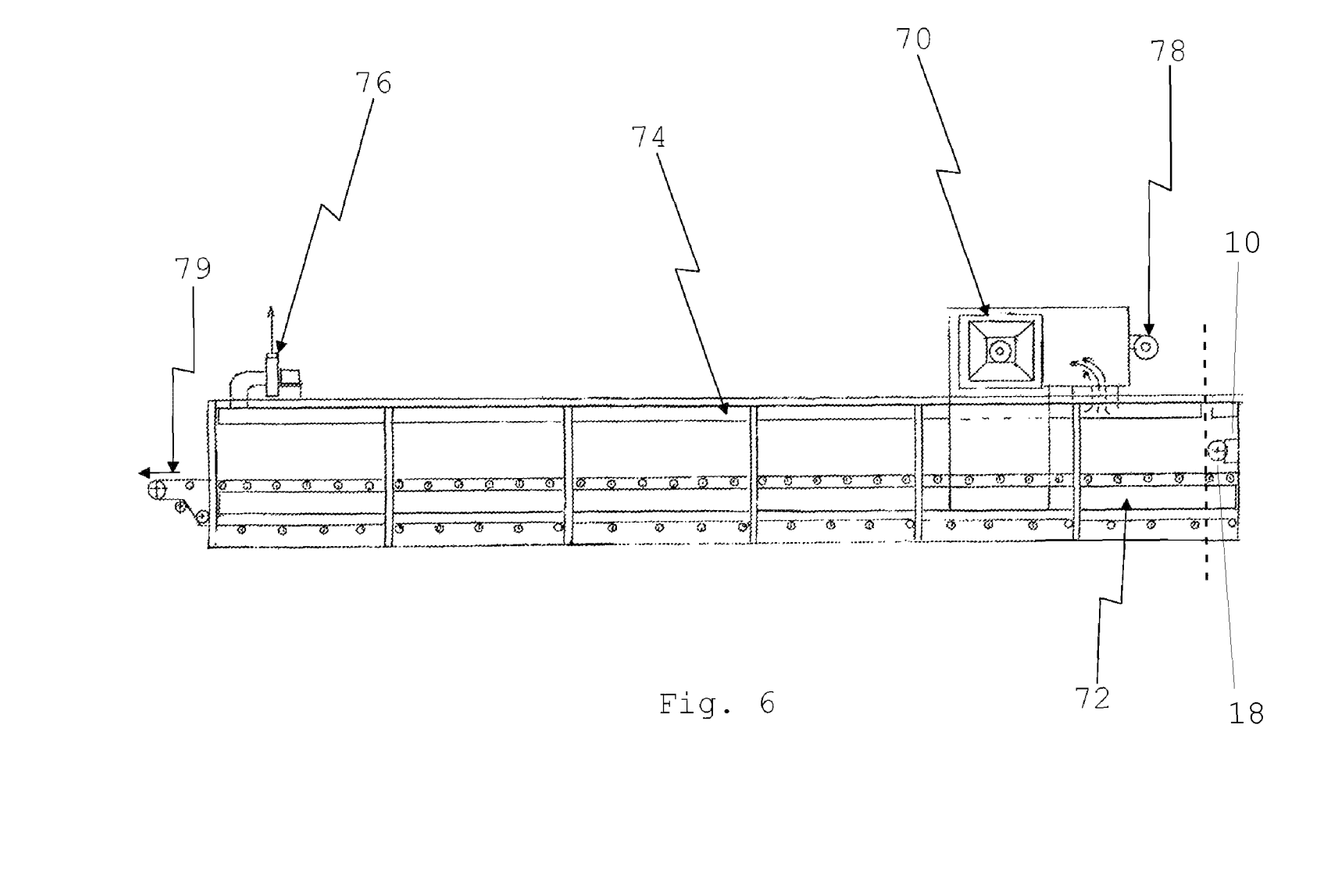
FIG. 6 shows a side view of a second zone of a heating apparatus and depicts a firebox and blower 70, hot air supply distribution duct 72, return air plenum 74, return air exhaust stack 76, make up air intake 78, and the direction of travel 79 of the fiberglass media, with a vertical dashed line indicating the boundary with the first zone.

Each heated zone has a fire box. There is a blower 30 for the first heated zone (shown in FIG. 3) and a blower 70 for the second heated zone (shown in FIG. 6), along with a separate exhaust stack at the top most section of each heated zone. The first heated zone also comprises air plenum and fume hood exhaust stack 40, and the second heated zone comprises return air exhaust stack 76.

The heated air is then collected above the media 12 through adjustable holes in plenum 34 at the topmost part of the first heated zone. There, return air in the plenum 34 can be returned to the firebox and blower 30 or exhausted out the first heated zone return air plenum and fume hood exhaust stack 40 in a way that recirculating air percentages can be controlled through make up air intake 42.

Figure 5:
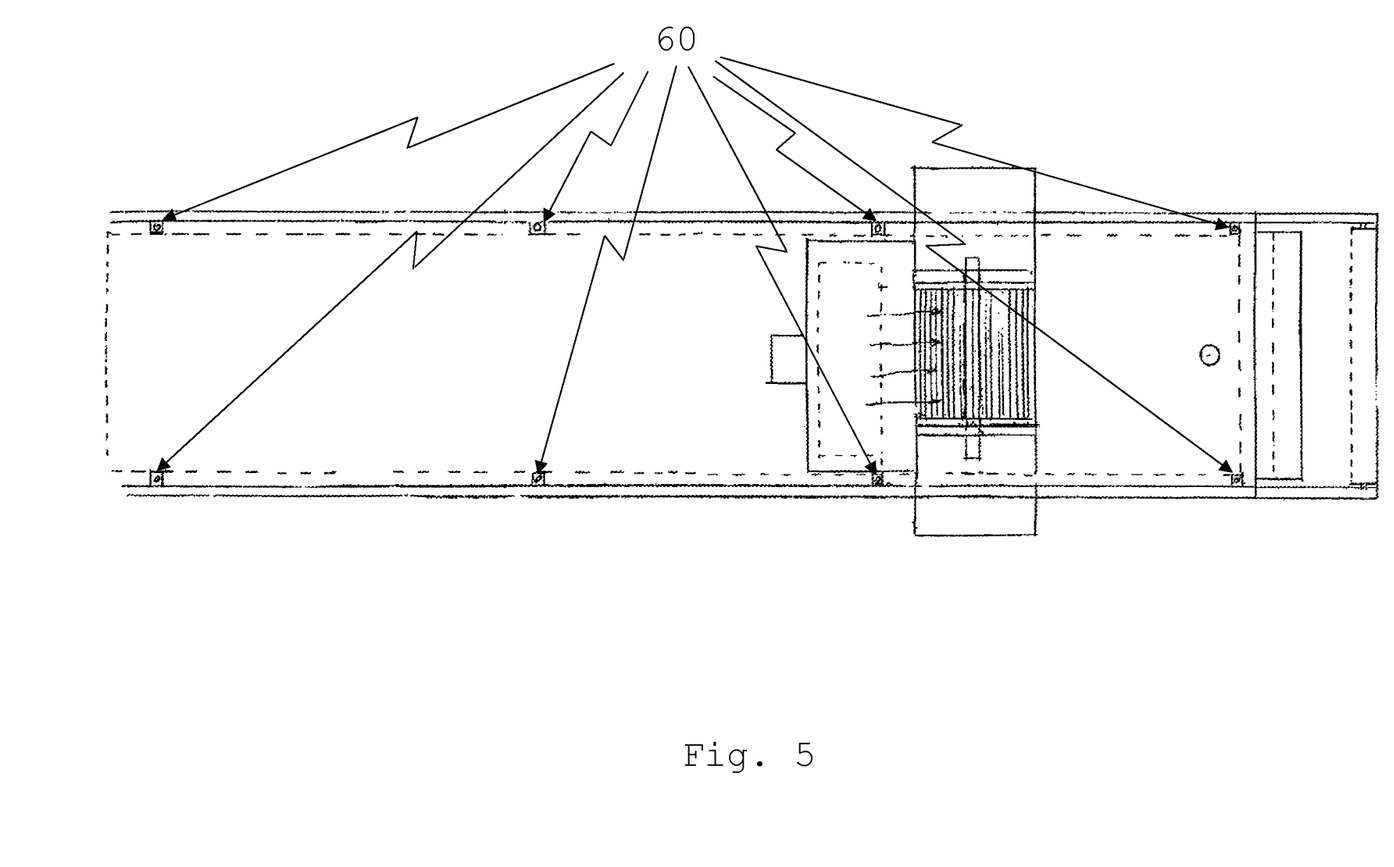
FIG. 5 shows a top view of a first zone of a heating apparatus and depicts upper compression conveyor belt lifting jacks 60 for loft control.

With reference to FIG. 5, the loft of the product is controlled through lifting jacks 60 which adjust and move the upper compression conveyor belt 10 either up or down automatically. The movement of the upper compression belt to change loft is typically 3 seconds, but could be almost instantaneously or up to a maximum of 20 seconds when changes are made from ¼ inch loft to 5 inch loft all at once, which is quickly enough such that no media 12 is ruined.

Also disclosed herein is an apparatus with a plurality of heated zones with a minimum of at least two heating zones. A first zone is heated to a temperature range of at least three hundred degrees Fahrenheit (300° F.) to no more than five hundred degrees Fahrenheit (500° F.). The first heated zone has a firebox and blower 30 disposed at the topmost section of the first zone, with an air intake 42 and a return air plenum 34, with the return air recycling direction of air flow 36 (as indicated in FIG. 3). Additionally, the topmost section of the first heated zone has a return air plenum exhaust coupled with a fume hood exhaust stack 40 and a fume hood 38 situated exterior to the heating apparatus) disposed just above upper compression conveyor belt tensioner 20 which is disposed above lower conveyor chain tensioner 22.

Figure 4:
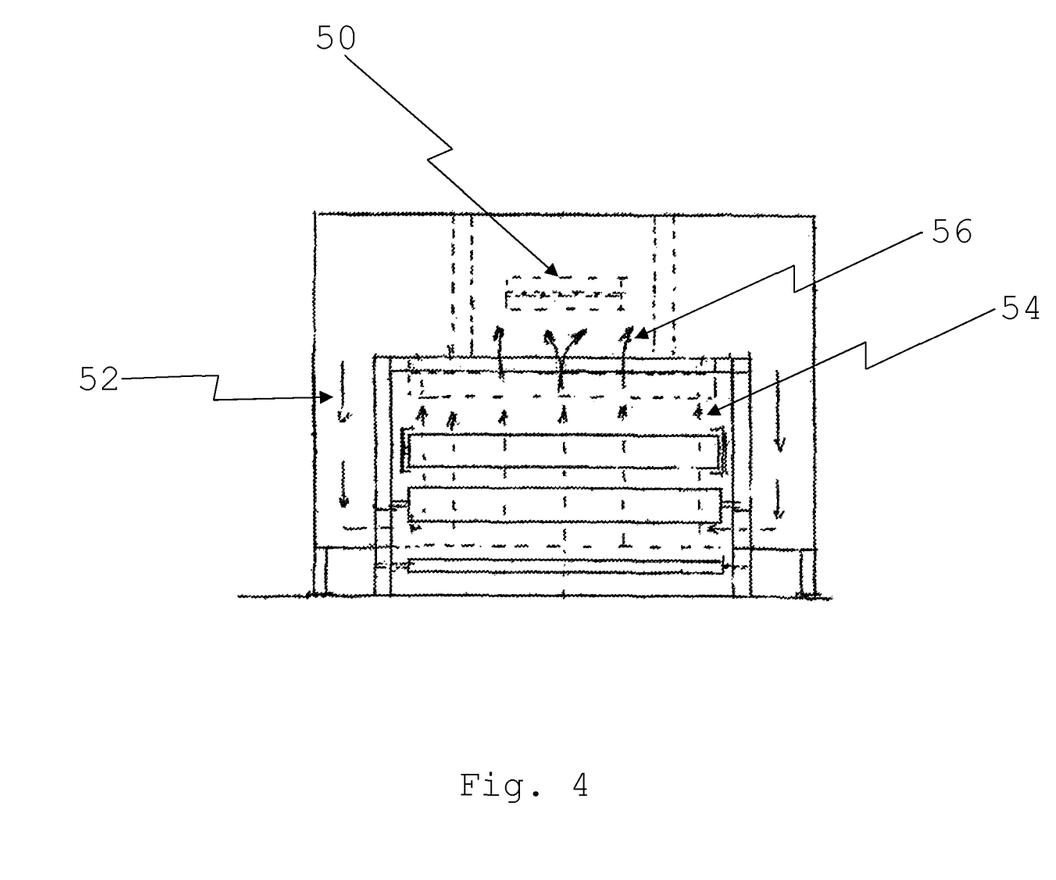
FIG. 4 shows an end view of an airflow control for a first zone of a heating apparatus and depicts a burner and firebox assembly 50, down draft ducts 52 with direction of airflow indicated away from the burner, direction of airflow updraft through fiberglass media 54, and direction of airflow from return air plenum to recycling 56.

In FIG. 4, the air flow and position of the ductwork are indicated relative to the firebox assembly 50 with direction of hot air travel in downdraft duct 52. The air is delivered at the bottom most area of the oven with direction of updraft of the hot air through the media 54 and flow of air from return air plenum to recycling 56. The ductwork is connected thereto with ducting conducting heated air from a blower and firebox through ducting disposed along the exterior wall of a first zone to a bottom most portion of the first zone. The heated air exits the ductwork through a series of rectangular slots under lower conveyor chain 16 presenting heated air with an upward flow through lower conveyor chain 16. The heated air then flows upward through a first surface of a fiberglass media through the fiberglass media to a second surface of a fiberglass media, then upward through upper compression conveyor belt 10.

A first upper compression conveyor belt 10 with a specified travel distance through the oven of at least fifteen feet and no more than one hundred feet in a first zone provides continuous contact of fiberglass media with heated air, which air is heated above three hundred degrees Fahrenheit (300° F.) to no more than five hundred degrees Fahrenheit (500° F.). Temperature is held for a specified period of time necessary to allow loft to begin to form with a second heated zone being 25 degrees cooler at the lower end for final curing of the fiberglass media. The heating apparatus functions as both a loft control system and a curing apparatus for fiberglass and has been designed with two extended length zones, a first heated zone and a second heated zone. This apparatus allows the use of urea formaldehyde or acrylic binders with a minimal amount of additives (e.g. catalysts or buffers), minimizing variables and simplifying the process of producing quality fiberglass media with better defined and more rigid skins. The addition of DEG (diethylene glycol) as an additive regulates moisture; however, it may only be added in a small percentage by weight. Additionally, this process allows successful curing of unexpanded fiberglass mats with a wider range of moisture levels. Ducting distributes heated air from a heated air distribution ducting below the bottom conveyor chain. This keeps the bottom conveyor chain cleaner and precludes most particulates from entering the exhaust stream, which keeps all the exhaust ducts cleaner. The heating apparatus further saves energy by recirculating eighty percent of the heated air in a first heated zone and ninety-five percent of the heated air in a second heated zone to maximize energy efficiency.

Synchronization of an upper compression conveyor belt 10 and a lower conveyor chain 16 can be accomplished with separate direct drives controlled by an encoder. Encoders are utilized to maintain synchronization even as belts stretch and components wear over time. Synchronization may further be maintained with an accumulator and a windup mechanism which are downstream of the heated apparatus. Both the accumulator and the windup mechanism maintain proper tension on the media throughout the process. The upper compression conveyor belt 10 is encased in a framework attached to lifting jacks 60 so that loft of the fiberglass media can be changed very quickly while media is still being processed. The lifting jacks 60 respond very quickly and adjust to preset set points.

To provide for better maintenance and longer service life, apparatus roller outboard bearings 100 (shown in FIG. 9) on the ends of the rollers 14 supporting the lower conveyor chain 16 have been relocated to the exterior of the apparatus, away from the high heat load, so that bearings can be lubricated while the heating and curing apparatus is processing fiberglass. The outboard bearings 100 are encased within an insulation board 110, an enclosure that maintains the temperature of the heating apparatus while lubrication occurs.

Figure 9:
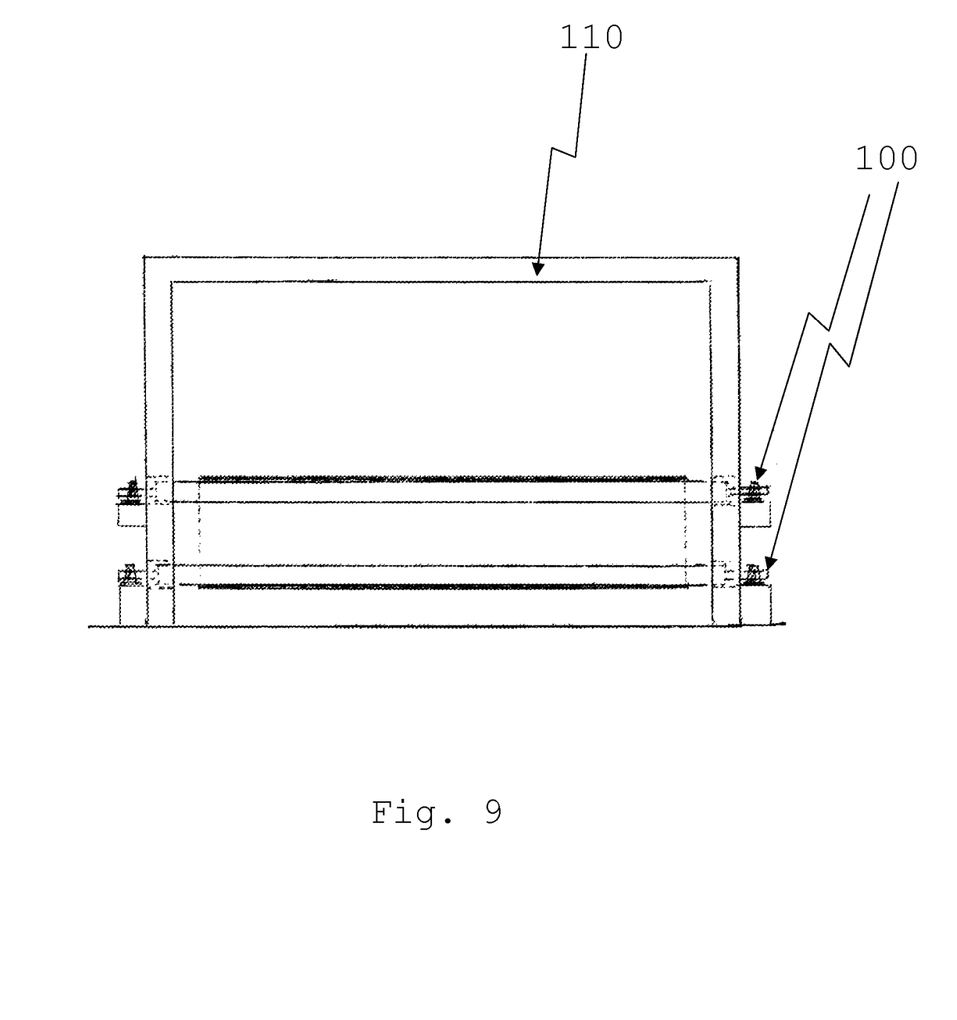
FIG. 9 shows a front view of outboard bearings 100 and insulation board 110.

The reduced heat exposure improves the life of the outboard bearings 100 and extends the interval between required lubrications. A lubrication system for the drive chains on the upper compression conveyor belt 10 lubricates the length of both drive chains, and having one on each side of the conveyor belt minimizes downtime for chain lubrication. Further access panels are added to key locations all along the length of the first heated and second heated zones to facilitate maintenance of components and monitoring of processes.

Since other modifications and changes varied to fit particular operating requirements and environments will be apparent to those skilled in the art, the disclosed subject matter is not considered limited to the examples chosen for purposes of disclosure, and covers all changes and modifications which do not constitute departures from the true spirit and scope of this subject matter.

What is claimed is:

1. A method for processing fiberglass media, the method comprising:
    providing fiberglass media onto a lower conveyor chain in a first heated zone;
    compressing the fiberglass media between the lower conveyor chain and an upper compression conveyer belt in the first heated zone;
    in the first heated zone, supplying heated air upward and in sequence through the lower conveyer chain, the fiberglass media, the upper compression conveyer belt, and into a first return air plenum;
    setting a height of the upper compression conveyer belt to set a loft of the fiberglass media between the upper compression conveyor belt and lower conveyor chain in the first heated zone;
    conveying the compressed fiberglass media into the second heated zone using the lower conveyor chain;

in the second heated zone, supplying heated air upward and in sequence through the lower conveyer chain, the fiberglass media, and into a second return air plenum; and removing the fiberglass media from the second heated zone, wherein no substantial volume of air flows downward through the lower conveyor chain in the first and second heated zones, and wherein the upper compression conveyor belt does not extend into the second heated zone so that the second zone heated air flows substantially directly from the fiberglass media into the second return air plenum.

2. The method of claim 1, wherein the temperature of the first heated zone is between three hundred degrees Fahrenheit and five hundred degrees Fahrenheit.

3. The method of claim 1, wherein:
the temperature of the second heated zone is between two hundred seventy-five degrees Fahrenheit and five hundred degrees Fahrenheit, and
the temperature of the second heated zone is at least twenty-five degrees Fahrenheit lower than the temperature of the first heated zone.

4. The method of claim 1, wherein setting the height of the upper compression conveyer belt comprises raising or lowering the upper compression conveyer belt in twenty seconds or less.

5. The method of claim 1, wherein setting the height of the upper compression conveyer belt comprises raising or lowering the upper compression conveyer belt in less than three seconds.

6. The method of claim 1, further comprising setting the height of the upper compression conveyer belt between ¼ inch and 5 inches with respect to the lower conveyor chain.

7. The method of claim 1, further comprising recirculating some of the heated air of the first heated zone.

8. The method of claim 1, further comprising recirculating some of the heated air of the second heated zone.

9. The method of claim 1, further comprising controlling a tension of the lower conveyor chain.

10. The method of claim 1, further comprising controlling a tension of the upper compression conveyor belt.

11. The method of claim 1, further comprising synchronizing a speed of the upper compression conveyor belt with a speed of the lower conveyor chain.

12. A method for processing fiberglass media, the method comprising:
driving a lower conveyor through a first heated zone and a second heated zone;
driving an upper conveyor in the first heated zone;
providing fiberglass media onto the lower conveyor;
compressing the fiberglass media between the upper and lower conveyors in the first heated zone;
setting and adjusting a height of the upper conveyer relative to the lower conveyor to set a loft of the fiberglass media in the first heated zone;
tensioning the upper conveyor;
tensioning the lower conveyor;
conveying the compressed fiberglass media into the second heated zone using the lower conveyor; and
supplying hot air upward and in sequence through the lower conveyor, fiberglass media, upper conveyer, and into a first return air plenum in the first heated zone and upward and in sequence through the lower conveyor, fiberglass media, and into a second return air plenum in the second heated zone,
wherein no substantial volume of air flows downward through the lower conveyor in the first and second heated zones, and
wherein the upper conveyor does not extend into the second heated zone so that the second zone hot air flows substantially directly from the fiberglass media into the second return air plenum.

13. The method of claim 12, further comprising:
supplying the hot air of the first and second heated zones from a first and second distribution duct, respectively, each of the first and second distribution ducts provided below the lower conveyor.

14. The method of claim 12, further comprising:
recirculating at least 50 percent of the hot air of the first heated zone; and
recirculating at least 50 percent of the hot air of the second heated zone.

15. The method of claim 12, wherein the first heated zone is between three hundred degrees Fahrenheit and five hundred degrees Fahrenheit.

16. The method of claim 12, wherein:
the second heated zone is between two hundred seventy-five degrees Fahrenheit and five hundred degrees Fahrenheit, and
the second heated zone is at least twenty-five degrees Fahrenheit lower than the first heated zone.

17. The method of claim 12, wherein setting the height of the upper conveyer comprises raising or lowering the upper conveyer in twenty seconds or less.

18. The method of claim 12, wherein setting the height of the upper conveyer comprises raising or lowering the upper conveyer in less than three seconds.

19. The method of claim 12, further comprising setting the height of the upper conveyer between ¼ inch and 5 inches from the lower conveyor.

20. The method of claim 12, further comprising synchronizing a speed of the upper conveyor with a speed of the lower conveyor.

* * * * *